United States Patent [19]

Shah et al.

[11] Patent Number: 5,059,884
[45] Date of Patent: Oct. 22, 1991

[54] VARIABLE RELUCTANCE MOTOR PROVIDING HOLDING TORQUE

[75] Inventors: Mahesh J. Shah; Jayant G. Vaidya, both of Rockford, Ill.

[73] Assignee: Sundstrand Corporation, Rockford, Ill.

[21] Appl. No.: 506,818

[22] Filed: Apr. 10, 1990

[51] Int. Cl.⁵ .............................................. H02P 5/42
[52] U.S. Cl. .................................. 318/701; 310/49 R; 310/155; 310/181; 310/168
[58] Field of Search ............... 310/49 R, 89, 168, 156, 310/111, 112, 163, 258, 181, 262, 152, 154, 155, 261, 254, 216, 269; 318/701

[56] References Cited

U.S. PATENT DOCUMENTS

| | | | |
|---|---|---|---|
| 1,957,399 | 5/1934 | Walther | 310/155 |
| 3,984,711 | 10/1976 | Kordik | 310/49 R |
| 4,048,531 | 9/1977 | Buess et al. | 310/49 R |
| 4,712,028 | 12/1987 | Horber | 310/49 R |
| 4,757,224 | 7/1988 | McGee et al. | 310/168 |
| 4,827,164 | 5/1989 | Horber | 310/49 R |
| 4,954,737 | 9/1990 | Guichard | 310/168 |

FOREIGN PATENT DOCUMENTS

| | | | |
|---|---|---|---|
| 2315793 | 2/1977 | France . | |
| 0525092 | 8/1940 | United Kingdom | 318/701 |
| 0529583 | 11/1940 | United Kingdom | 318/701 |

Primary Examiner—R. Skudy
Attorney, Agent, or Firm—Antonelli, Terry, Stout & Kraus

[57] ABSTRACT

A variable reluctance motor (10, 100, 200) for providing holding torque in accordance with the invention includes a magnetically permeable rotor (12); a stator (18) axially aligned with the rotor having at least one phase winding (22) for producing a magnetic field causing the rotor to rotate; and a first cylindrical magnet (26) mounted coaxial with and outboard from a first side of the rotor which creates a permanent magnetic field coupling the rotor to the magnet to provide holding torque.

21 Claims, 4 Drawing Sheets

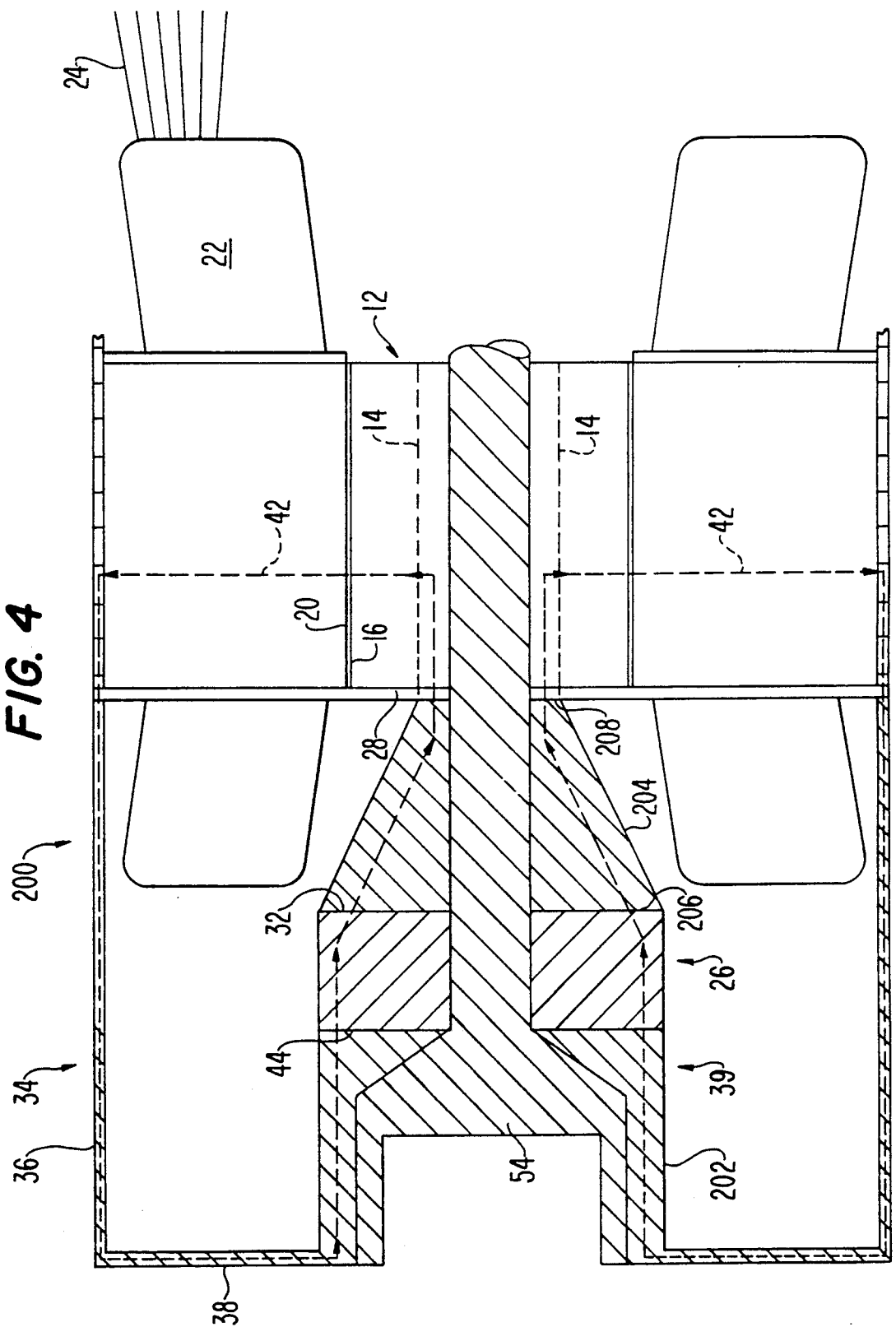

VARIABLE RELUCTANCE MOTOR PROVIDING HOLDING TORQUE

TECHNICAL FIELD

The present invention relates to variable reluctance motors providing holding torque.

BACKGROUND ART

The stators and rotors of variable reluctance machines have magnetic saliencies commonly known as salient poles. Such a configuration is commonly called "doubly salient" as illustrated in FIG. 1. Each stator pole 2 is surrounded by a winding of one or more turns of electrically conductive material and appropriate insulation. A phase winding 3 is a pair of series connected windings respectively wound on diametrically opposed poles 2. Only one phase winding 3 is illustrated with it being understood that the remaining pairs of poles each have a phase winding wound on them. The phase windings 3 are grouped together so that a balanced torque is produced in the machine when the windings are excited from an external source of electrical energy and also so that voltage and current requirements of the external source are satisfied. There are no windings of any type or magnets associated with the machine rotor 4. The number of poles on the stator 5 differ from the number of poles on the rotor 4. When the rotor 4 is rotated with respect to the stationary stator poles 2, a variation in reluctance is observed in stator poles. This variation in reluctance is observed as a variation in the inductance of the phase windings 3 which can be readily measured by appropriate instrumentation. Starting from the condition of a stator pole 2 being exactly half way between two rotor poles 6, known as the "unaligned position", the inductance of the phase winding 3 has its minimum value. The unaligned condition in most variable (switched) reluctance machines generally exists throughout an arc of several degrees of rotor rotation. The inductance of the phase winding 3 is fairly constant at its minimum value throughout this arc. Excitation of the phase windings 3 during this rotation period of constant, minimum inductance results in negligible developed torque. As the rotor 4 turns beyond the arc of minimum inductance, the inductance measured in the phase winding 3 increases to a maximum value, which is when a pair of rotor and stator poles 6 and 2 are exactly aligned, known as the "aligned position" as illustrated in FIG. 1. When the stator winding 3 is excited with an electrical current as the inductance is increasing from minimum to maximum motor torque is developed on the machine shaft 7. When the phase winding 3 is excited as the inductance is decreasing from maximum to minimum, torque of the opposite direction is developed on the shaft 7. This torque is often termed "generator torque" or "regenerative torque", the latter term being associated with a motor in a braking mode. The dotted line 8 illustrates the electromagnetic field flux linkage through the rotor 4, rotor poles 6, stator poles 2 and stator core 9 in the minimum reluctance position. The electromagnetic flux does not have an appreciable component in axial direction parallel to the machine shaft 7.

In modern variable reluctance machines, switching of the phase windings 3 is accomplished by solid state switching devices, generally known as power semiconductors. Specific switching devices include thyristors, transistors, MOSFETs, IGBT's, and many other devices including combinations of the abovementioned devices. In general, the power semiconductors are operated in an "on/off" mode rather than a linear mode associated with linear amplifiers. The switching times of the power semiconductors are determined by a controller. The controller operates in response to various sensors which sense such machine parameters as the position of the rotor poles with respect to the stator poles, current levels in the windings, voltage levels, or other signals required for the desired operation and protection of the machine.

Variable reluctance motors exist which utilize permanent magnets to provide holding torque. See U.S. Pat. Nos. 3,984,711, 4,048,531, 4,712,028 and French Patent 2,315,793. The systems disclosed in U.S. Pat. Nos. 3,984,711 and 4,712,028 have permanent magnets disposed within the slots of the stator. The magnets disclosed in the '711 patent and '028 patent within the slots of the stator reduce the efficiency of the motor from the standpoint of providing maximum torque and power by reducing the space which could be utilized for electrical windings to produce electromagnetic flux which produces motor torque. The motors disclosed in the '711 and '028 patents, have the magnets located in a high temperature zone as a consequence of the heat generated by the windings within the stator slots which can reduce the flux of the permanent magnets over their useful life. Finally, the stator structure of the '711 and '028 patents is complicated in that the windings and permanent magnets must both be disposed in the slots including structures to mount the permanent magnets permanently within the stator slots. Finally, the location of the magnets on the face of the salient poles of the stator of the '028 patent can cause interference with the magnetic field linkages with the rotor during normal motor operation. The motor disclosed in U.S. Pat. No. 4,048,531 utilizes a pair of rotors and stators with a second stator having a permanent magnet which generates a magnetic field used for generating holding torque. The structure of the '531 patent is complicated in requiring multiple stators and rotors. The variable reluctance stepping motor disclosed in French Patent 2,315,793 is a mechanically complicated structure with the rotor offset axially from the control windings which results in an elongated motor structure. The permanent magnet utilized in the '793 patent is axially aligned with the stator windings at a radius greater than the stator windings.

U.S. Pat. No. 4,827,164 discloses a stepping motor with salient stator poles. The salient stator poles have permanent magnets mounted on arcuate surfaces facing the rotor. The permanent magnets develop holding torque.

DISCLOSURE OF INVENTION

The present invention is a variable reluctance motor for providing holding torque and a method of operating a variable reluctance motor for providing holding torque. With the invention, at least one cylindrical permanent magnet is mounted coaxial with and outboard from a magnetically permeable rotor and a stator axially aligned with the rotor having at least one phase winding for producing an electromagnetic field causing the rotor to rotate. The cylindrical permanent magnet creates a permanent magnetic field coupling the rotor to the magnet to provide holding torque. The magnetic fields produced by the at least one phase winding and the at least one cylindrical magnet have components which are orthogonal to each other. As a result, the holding torque produced by the at least one cylindrical permanent magnet does not interfere with the electromagnetic torque produced by the at least one phase winding. The cylindrical permanent magnets are made from a material having a high magnetic coercivity. A first face of the cylindrical magnet may be aligned with a face of the rotor or with the stator. A magnetically permeable material magnetically links a second face of the cylindrical permanent magnet to either a face of the rotor or to the stator to provide a low reluctance circuit to provide efficient linkage of the permanent magnet field to the rotor to hold the rotor in a low reluctance position when the motor is not activated.

The present invention has a number of advantages over that provided by the prior art. First, providing holding torque based upon placing of at least one cylindrical magnets outboard from the rotor and stator does not involve the complex machining operations required for the magnets utilized in U.S. Pat. Nos. 4,712,028 and 4,827,164. As a result, the overall construction of the variable reluctance motor is simplified and is less costly. The cylindrical permanent magnets themselves are not complex in shape and do not require complex machining operations. The placement of the permanent magnets outboard from the rotor and stator provides for increased torque and power as a consequence of the stator slots being used only to contain windings for generating motor torque. The permanent magnets are located away from the highest temperature areas of the variable reluctance motor which occur in proximity to the slot area where the phase windings are located which prevents possible loss of permanent magnetic field strength over the life of the motor. The motor provides more torque and power per pound than variable reluctance motor designs producing holding torque with permanent magnets in which the magnets are located in the slot area. Finally, failure of permanent magnets located in the slot area could interfere with the air gap between the rotor and stator resulting in potentially serious damage to the rotor or stator.

A variable reluctance motor for providing holding torque in accordance with the invention includes a magnetically permeable rotor having a first number of poles; a stator axially aligned with the rotor having at least one phase winding for producing an electromagnetic field causing the rotor to rotate with the stator having a second number of poles different than the first number of poles; and a first cylindrical permanent magnet mounted coaxial with and outboard from a first side of the rotor which creates a permanent magnetic field coupling the rotor to the magnet to provide holding torque; and wherein a reluctance of a variable magnetic flux linkage magnetic circuit magnetically coupling the stator to the rotor is a maximum when the poles of the rotor are aligned with poles of the stator during motor operation with torque being produced by variation of the reluctance of the variable reluctance magnetic circuit. The first cylindrical magnet is also outboard from the stator core. The cylindrical permanent magnet has a first annular surface which faces a surface of the rotor with magnetic flux passing between the first annular surface and the surface of the rotor during providing of holding torque. A magnetic circuit, conducts electromagnetic flux during motor operation having a section which is orthogonal to a section of a magnetic circuit which conducts permanent magnet flux during the generation of holding torque.

The invention further includes a magnetically permeable material disposed between the stator and a second annular surface of the cylindrical permanent magnet opposed to the first annular surface of the cylindrical permanent magnet for providing a magnetic flux path linking the stator and the second annular surface. The invention further includes a second cylindrical permanent magnet mounted coaxial with and outboard of a second side of the rotor, opposed to the first side of the rotor, and outboard of the stator core which creates a permanent magnetic field coupling the rotor to the second cylindrical permanent magnet to provide additional holding torque and having a first annular surface which faces the second side of the rotor with the permanent magnetic flux passing between the first annular surface of the second cylindrical permanent magnet and the second side of the rotor during providing of holding torque; and a magnetically permeable housing having an outer cylindrical section which surrounds the stator and extends axially outward past the first and second cylindrical permanent magnets, first and second sections respectively projecting radially inward from the outer cylindrical section at points outboard from the first and second cylindrical magnets which respectively couple permanent magnetic flux form the stator to a second annular surface of the first cylindrical permanent magnet and to a second annular surface of the second cylindrical permanent magnet. The invention further includes first and second inner cylindrical sections respectively projecting from the first and second sections to the second annular surface of the first cylindrical permanent magnet and to the second annular surface of the second cylindrical permanent magnet.

Alternatively, the first cylindrical permanent magnet has a first annular surface having a diameter larger than the diameter of the rotor which faces a side of the stator core with magnetic flux passing between the first annular surface and the side of the stator core during providing of holding torque. The invention further includes a magnetically permeable material disposed between the rotor and a second annular surface of the cylindrical permanent magnet, opposed to the first annular surface, for providing a permanent magnetic flux path between the rotor and the second annular surface. An outer diameter of the first cylindrical permanent magnet is greater than an outer diameter of the rotor and the invention further includes a conical section of magnetically permeable material having a first surface facing the first annular surface of the first permanent magnet and a second surface which faces the second surface of the rotor.

A method of providing holding torque for a rotor of a variable reluctance motor having a stator having a first number of poles axially aligned with a rotor having a second number of poles different than the first number of poles and a cylindrical permanent magnet mounted coaxial with outboard from a first side of the rotor with a magnetic flux linkage of a variable reluctance magnetic circuit magnetically coupling the stator to the rotor is a maximum when poles of the rotor are aligned with poles of the stator during motor operation with torque being produced by variation of the reluctance of the variable reluctance magnetic circuit includes applying electrical current to at least one phase winding of the stator to produce an electromagnetic field linked to the rotor without a component producing motor torque extending in an axial direction with respect to an axis of the rotor to cause the rotor to rotate through at least one minimum reluctance position between the stator and rotor; and holding the rotor in a fixed position of minimum reluctance by a permanent magnetic field produced by the cylindrical permanent magnet passing through a pair of aligned stator and rotor poles after electrical current is no longer applied to the at least one phase winding with a component of the permanent magnetic field extending in the axial direction during production of holding torque.

BRIEF DESCRIPTION OF DRAWINGS

FIG. 4 illustrates a third embodiment of the present invention.

BEST MODE FOR CARRYING OUT THE INVENTION

Figure 1:
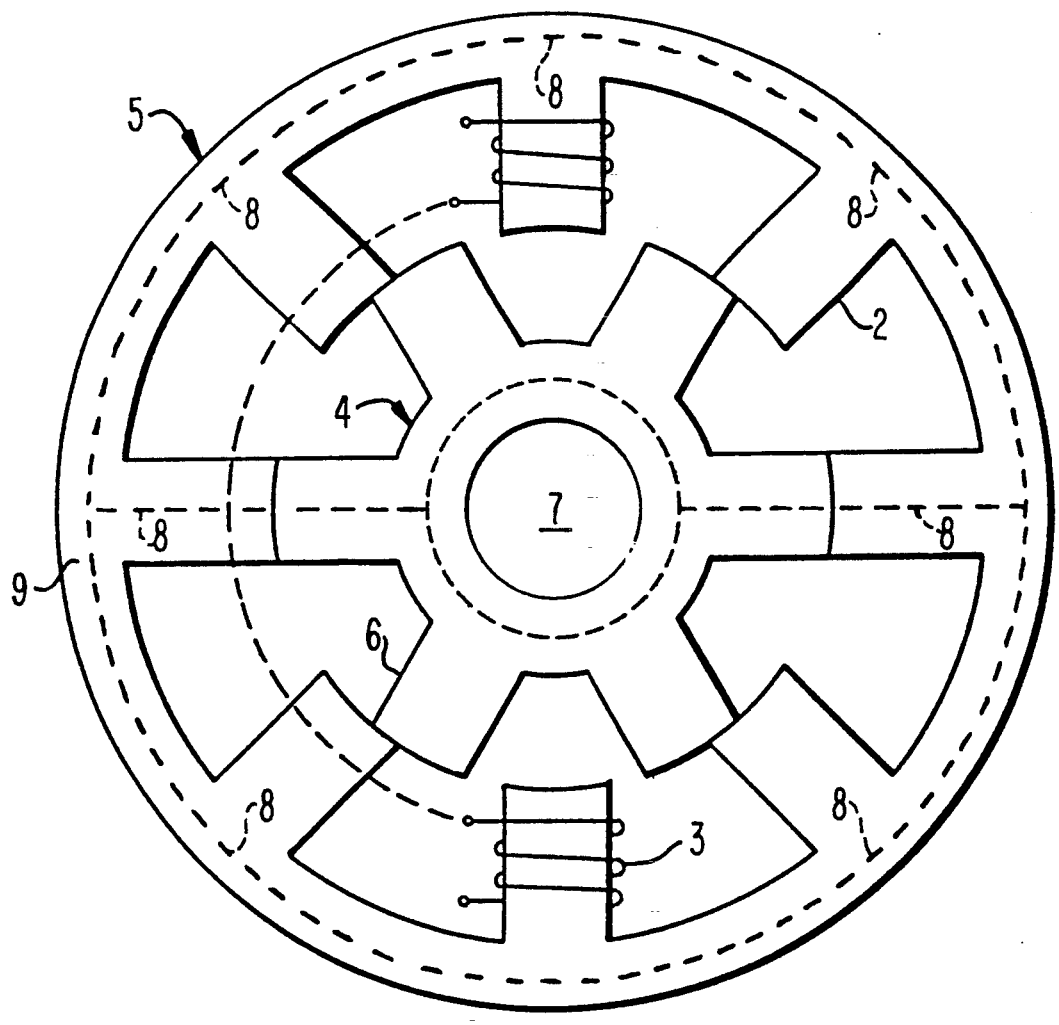
FIG. 1 illustrates a prior art variable reluctance machine.
Figure 2:
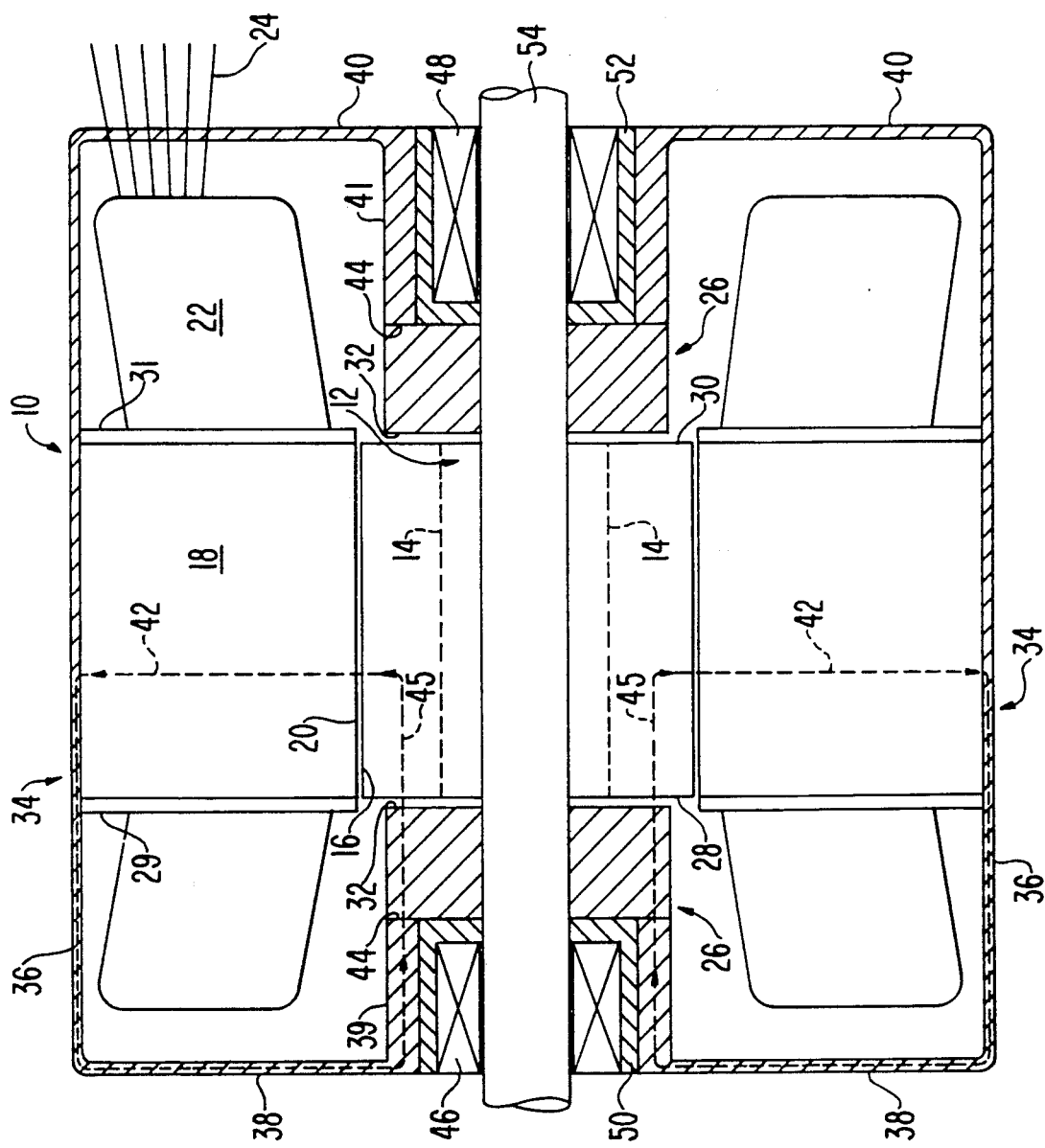
FIG. 2 illustrates a first embodiment of the present invention.

FIG. 2 illustrates a first embodiment 10, of a variable reluctance motor in accordance with the present invention which provides holding torque with a permanent magnet field when the motor windings are not activated. The construction of the rotor 12 and stator 18 of the variable reluctance motor 10 of FIG. 2 is in accordance with the prior art of FIG. 1. Furthermore, the switching of one or more phase windings 22 contained within the slots of the stator, as illustrated in FIG. 1, is in accordance with the prior art including the sequence described in conjunction with FIG. 1. The rotor 12 has a plurality of salient poles as illustrated in FIG. 1. The rotor does not have any windings. Dotted line 14 represents the smallest radius of the rotor 12 which is made of a magnetic material which is highly permeable to promote maximum magnetic flux linkage. The dotted line 14 represents the space between adjacent salient rotor poles. The salient rotor poles extend radially outward to point 16 which faces the inner cylindrical surface 20 of stator 18 which has salient poles in accordance with the prior art as illustrated in FIG. 1. One or more phase windings 22 are wound within the slots of the stator as illustrated schematically in FIG. 1 which in practice are wound to fill the space between adjacent salient poles. The output leads for the phase windings 24 are connected to a suitable power source which contains one or more phases which applies switching pulses to the individual phase windings as described in conjunction with the prior art of FIG. 1 to produce motor torque.

Holding torque in the embodiment of FIG. 2 is produced by a pair of cylindrical permanent magnets 26 which are mounted outboard of first and second sides 28 and 30 of the rotor 12 and first and second sides 29 and 31 of the core of the stator 18. A first annular surface 32 of the left-hand cylindrical magnet 26 faces annular side 28 of the rotor 12. A first annular surface 32 of the right-hand cylindrical magnet 26 faces the annular surface 30 of the rotor 12. A housing 34 of a highly magnetically permeable material provides a magnetic flux path coupling the rotor 12 to the permanent magnetic field produced by the permanent magnets 26 to provide holding torque. The magnetically permeable housing 34 is comprised of an outer cylindrical section 36 which surrounds the stator 18 and extends axially outward to a position outboard of the cylindrical magnets 26, first and second sections 38 and 40 respectively projecting radially inward from the outer cylindrical section at points axially outboard from the first and second cylindrical magnets and first and second inner cylindrical sections 39 and 41 which respectively couple magnetic flux from the stator to a second annular surface 44 of the left-hand and right-hand cylindrical permanent magnets 26. Suitable bearings 46 and 48 are held in a bearing retainer 50 and 52, respectively, to rotatably support the rotor 12 which is attached to shaft 54. The magnetically permeable housing 34 provides a high degree of magnetic flux linkage with the permanent magnets 26 to enhance the holding torque provided by the attraction of the permanent magnet field with the rotor 12 when the salient poles of the stator and rotor are aligned as in FIG. 1. After motor action ceases, the magnetic field 42 causes a pair of salient rotor poles to rotate to a minimum reluctance position with a corresponding pair of stator poles as illustrated in FIG. 1. Furthermore, the magnetic field 42 produced by the cylindrical magnets 26 is uniformly circumferentially coupled to the first and second faces 32 and 44 which does not interfere with the magnetic field produced by activating the phases of the phase windings 22 during normal motor operation as a consequence of the permanent magnetic field having an axially extending component 45 which has no counterpart to the component 8 of the magnetic field of FIG. 1 during the production of motor torque with the electromagnetic field as illustrated in FIG. 1. The magnetic field component 45 is perpendicular to the component 8 of FIG. 1.

Figure 3:
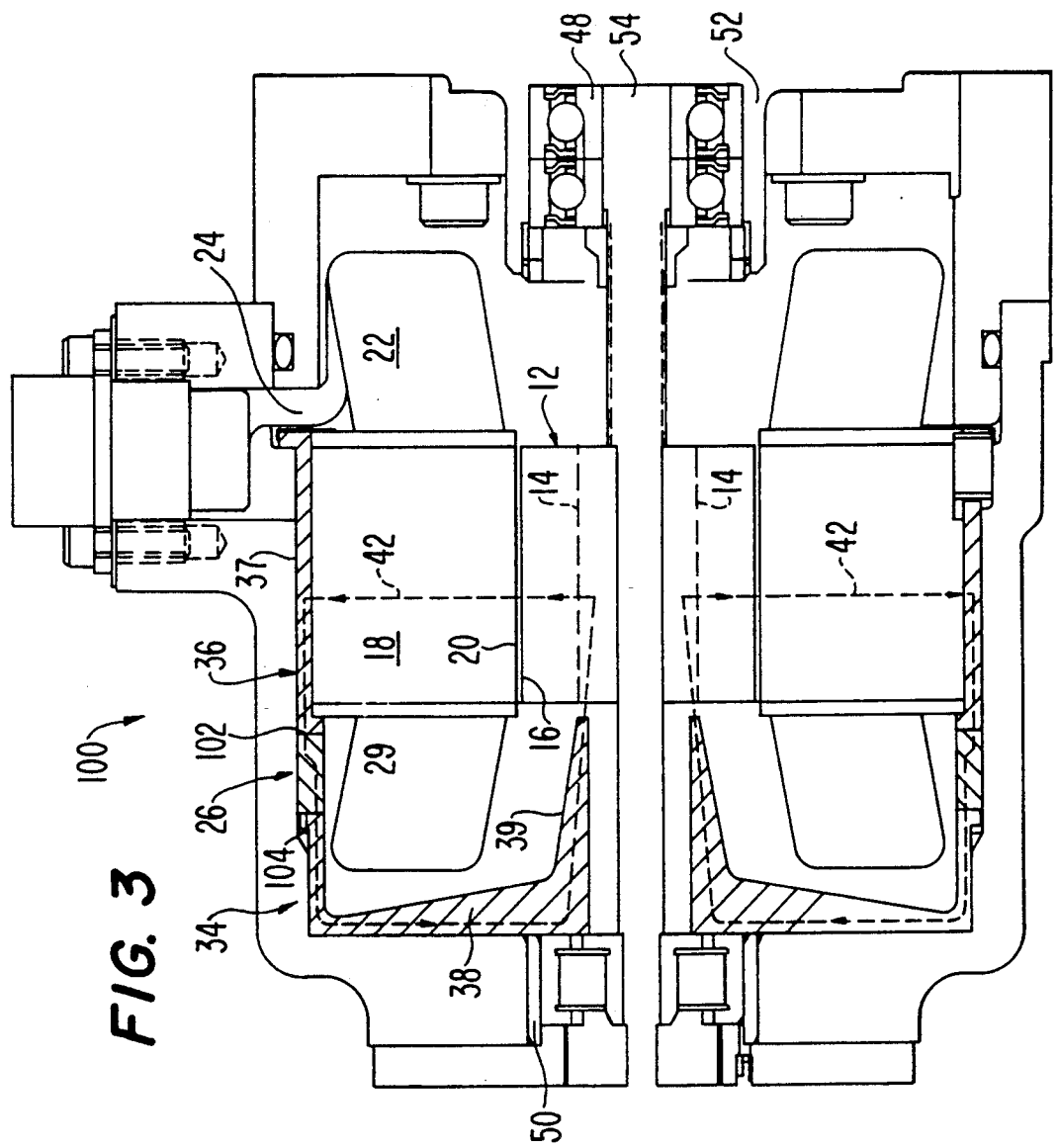
FIG. 3 illustrates a second embodiment of the present invention.

FIG. 3 illustrates a second embodiment 100 of a variable reluctance motor producing holding torque with a permanent magnet field. Like reference numerals identify like parts in FIGS. 2 and 3. The principal differences between the embodiments of FIGS. 2 and 3 are that in FIG. 3 only a single cylindrical magnet 26 is illustrated with it being understood that a pair of cylindrical magnets could be utilized by modifying the right-hand side of the second embodiment to contain the structures contained in the left-hand side of the second embodiment and further that the cylindrical magnet has a first surface 102 which faces a segment 37 of the outer cylindrical section 36 of the magnetically permeable housing 34 and the surface 29 of the core of the stator 18 and a second surface 104 which faces the first section 38. The magnetic field 42 produced by the permanent magnet 26 provides holding torque in the minimum reluctance position between a pair of salient poles of the rotor 12 and a corresponding pair of salient poles of the stator 18 as illustrated in FIG. 1 as described above with respect to the embodiment of FIG. 2.

FIG. 4 illustrates a third embodiment 200 of the present invention. Like reference numerals identify like parts in FIGS. 2–4. The embodiment of FIG. 4 differs from that of FIG. 2 principally in that the first inner cylindrical section 39 of the magnetically permeable housing 34 is divided into parts 202 and 204 with the cylindrical permanent magnet 26 being located in between these parts. The magnetically permeable housing 34 functions in the same manner as discussed above with respect to FIGS. 2 and 3 in that after rotation of the rotor 12 has stopped, the permanent magnetic field 42 aligns a pair of salient rotor poles in a minimum reluctance position with a pair of salient stator poles as illustrated in FIG. 1. The high magnetic permeability of the housing 34, which provides a low reluctance path, permits a high degree of magnet flux coupling enhancing the holding torque provided by the permanent magnet field. The part 204 of the inner cylindrical section 39 is a conical part having a first surface 206 which faces the annular surface 32 of the cylindrical permanent magnet 26 and second surface 208 truncating the conical section which faces the surface 28 of the rotor.

A method of providing holding torque for a rotor of a variable reluctance motor as illustrated in FIGS. 2-4 with a cylindrical permanent magnet 26 mounted coaxial with and outboard from a first side of the rotor 12 includes applying electrical current to at least one phase winding 22 of the stator 18 to produce an electromagnetic field linked to the rotor without a component producing motor torque extending in an axial direction to an axis of the rotor to cause the rotor 12 to rotate through at least one minimum reluctance position between poles of the stator and rotor; and holding the rotor in a fixed position of minimum reluctance by a permanent magnetic field 42 produced by the cylindrical permanent magnet passing through a pair of aligned stator and rotor poles as illustrated in FIG. 1 after electrical current is no longer applied to the at least one phase winding with a component of the permanent magnetic field extending in the axial direction during production of holding torque.

While the invention has been described in terms of its preferred embodiments, it should be understood that numerous modifications may be made thereto without departing from the spirit and scope of the invention. For example, while the embodiments of FIGS. 3 and 4 only illustrate a single cylindrical magnet placed on one side of the rotor, it should be understood that these embodiments may be modified to place a second cylindrical magnet outboard of the rotor and stator case on the other side of the motor in the same manner as in the embodiment of FIG. 2. It is intended that all such modifications fall within the scope of the appended claims.

We claim:

1. A variable reluctance motor for providing holding torque comprising:
    a magnetically permeable rotor not having windings and having a first number of poles;
    a stator axially aligned with the rotor having at least one phase winding for producing a magnetic field causing the rotor to rotate with the stator having a second number of poles different than the first number of poles; and
    a first cylindrical permanent magnet mounted coaxial with and outboard from a first side of the rotor which creates a permanent magnetic field coupling the rotor to the magnet to provide holding torque; and wherein
    a magnetic flux linkage of a variable reluctance magnetic circuit magnetically coupling the stator to the rotor is a maximum when poles of the rotor are aligned with poles of the stator during motor operation with torque being produced by variation of the reluctance of the variable reluctance magnetic circuit.

2. A variable reluctance motor in accordance with claim 1 wherein:
    the first cylindrical permanent magnet is mounted outboard from a core of the stator.

3. A variable reluctance motor in accordance with claim 1 wherein:
    the cylindrical permanent magnet has a first annular surface which faces a surface of the rotor with magnetic flux passing between the first annular surface and the surface of the rotor during providing of holding torque.

4. A variable reluctance motor in accordance with claim 2 wherein:
    the cylindrical permanent magnet has a first annular surface which faces a surface of the rotor with magnetic flux passing between the first annular surface and the surface of the rotor during providing of holding torque.

5. A variable reluctance motor in accordance with claim 1 further comprising:
    a magnetic circuit which conducts electromagnetic flux during motor operation having a section which is orthogonal to a section of a magnetic circuit which conducts permanent magnet flux during the generation of holding torque.

6. A variable reluctance motor in accordance with claim 2 further comprising:
    a magnetic circuit which conducts electromagnetic flux during motor operation having a section which is orthogonal to a section of a magnetic circuit which conducts permanent magnet flux during the generation of holding torque.

7. A variable reluctance motor in accordance with claim 3 further comprising:
    a magnetic circuit which conducts electromagnetic flux during motor operation having a section which is orthogonal to a section of a magnetic circuit which conducts permanent magnet flux during the generation of holding torque.

8. A variable reluctance motor in accordance with claim 4 further comprising:
    a magnetic circuit which conducts electromagnetic flux during motor operation having a section which is orthogonal to a section of a magnetic circuit which conducts permanent magnet flux during the generation of holding torque.

9. A variable reluctance motor in accordance with claim 2 further comprising:
    a magnetically permeable material disposed between the stator and a second annular surface of the cylindrical permanent magnet, opposed to the first annular surface, for providing a magnetic flux path linking the stator and the second annular surface.

10. A variable reluctance motor in accordance with claim 2 further comprising:
    a second cylindrical permanent magnet mounted coaxial with and outboard of a second side of the rotor, opposed to the first side of the rotor, and outboard of a stator core which creates a permanent magnetic field coupling the rotor of the second cylindrical magnet to provide additional holding torque and having a first annular surface which faces the second side of the rotor with magnetic flux passing between the first annular surface of the second cylindrical magnet and the second side of the rotor during providing of holding torque; and
    a magnetically permeable material having an outer cylindrical section which surrounds the stator and extends axially outward past the first and second cylindrical permanent magnets, first and second sections respectively projecting radially inward from the cylindrical section at points axially outboard from the first and second cylindrical magnets which respectively couple magnetic flux from the stator to a second annular surface of the first cylindrical permanent magnet and to a second annular surface of the second cylindrical permanent magnet.

11. A variable reluctance motor in accordance with claim 10 further comprising:
   first and second inner cylindrical sections respectively projecting from the first and second sections to the second annular surface of the first cylindrical permanent magnet and to the second annular surface of second cylindrical permanent magnet.

12. A variable reluctance motor in accordance with claim 1 wherein:
   the first cylindrical permanent magnet has a first annular surface having a diameter larger than a diameter of the rotor which faces a side of the stator with magnetic flux passing between the first annular surface and the core of the stator during providing of holding torque.

13. A variable reluctance motor in accordance with claim 12 further comprising:
   a magnetically permeable material disposed between the rotor and a second annular surface of the cylindrical permanent magnet, opposed to the first surface, for providing a magnetic flux path between the rotor and the second annular surface.

14. A variable reluctance motor in accordance with claim 9 wherein:
   an outer diameter of the first cylindrical permanent magnet is greater than an outer diameter of the rotor, and further comprising;
   a conical section of magnetically permeable material having a first surface facing the first annular surface of the first permanent magnet and a second surface which faces the surface of the rotor.

15. A variable reluctance motor in accordance with claim 9 further comprising:
   a magnetic circuit which conducts electromagnetic flux during motor operation having a section which is orthogonal to a section of a magnetic circuit which conducts permanent magnet flux during the generation of holding torque.

16. A variable reluctance motor in accordance with claim 10 further comprising:
   a magnetic circuit which conducts electromagnetic flux during motor operation having a section which is orthogonal to a section of a magnetic circuit which conducts permanent magnet flux during the generation of holding torque.

17. A variable reluctance motor in accordance with claim 11 further comprising:
   a magnetic circuit which conducts electromagnetic flux during motor operation having a section which is orthogonal to a section of a magnetic circuit which conducts permanent magnet flux during the generation of holding torque.

18. A variable reluctance motor in accordance with claim 12 further comprising:
   a magnetic circuit which conducts electromagnetic flux during motor operation having a section which is orthogonal to a section of a magnetic circuit which conducts permanent magnet flux during the generation of holding torque.

19. A variable reluctance motor in accordance with claim 13 further comprising:
   a magnetic circuit which conducts electromagnetic flux during motor operation having a section which is orthogonal to a section of a magnetic circuit which conducts permanent magnet flux during the generation of holding torque.

20. A variable reluctance motor in accordance with claim 14 further comprising:
   a magnetic circuit which conducts electromagnetic flux during motor operation having a section which is orthogonal to a section of a magnetic circuit which conducts permanent magnet flux during the generation of holding torque.

21. A method of providing holding torque for a rotor of a variable reluctance motor having a stator having a first number of poles axially aligned with a rotor not having windings and having a second number of poles different than the first number of poles and a cylindrical permanent magnet mounted coaxial with and outboard from a first side of the rotor with a magnetic flux linkage of a variable reluctance magnetic circuit magnetically coupling the stator to the rotor is a maximum when poles of the rotor are aligned with poles of the stator during motor operation with torque being produced by variation of the reluctance of the variable reluctance magnetic circuit comprising:
   applying electrical current to at least one phase winding of the stator to produce an electromagnetic field linked to the rotor without a component producing motor torque extending in an axial direction with respect to an axis of the rotor to cause the rotor to rotate through at least one minimum reluctance position between the stator and rotor; and
   holding the rotor in a fixed position of minimum reluctance by a magnetic field produced by the cylindrical permanent magnet passing through a pair of aligned stator and rotor poles after electrical current is no longer applied to the at least one phase winding with a component of the permanent magnetic field extending in the axial direction during production of holding torque.

* * * * *